(12) United States Patent
Swieboda et al.

(10) Patent No.: US 6,819,257 B2
(45) Date of Patent: Nov. 16, 2004

(54) APPARATUS AND METHOD FOR MOUNTING A DETECTOR

(75) Inventors: Michael A. Swieboda, Naperville, IL (US); Thomas E. Meitl, Geneva, IL (US); Andrew J. Ivanecky, Aurora, IL (US); Lulzim Osmani, Glen Ellyn, IL (US)

(73) Assignee: BRK Brands, Inc., Aurora, IL (US)

(*) Notice: Subject to any disclaimer, the term of this patent is extended or adjusted under 35 U.S.C. 154(b) by 212 days.

(21) Appl. No.: 10/008,602

(22) Filed: Dec. 6, 2001

(65) Prior Publication Data
US 2003/0107495 A1 Jun. 12, 2003

(51) Int. Cl.[7] ............................................. G08B 23/00
(52) U.S. Cl. ............................... 340/693.5; 340/691.1; 340/628
(58) Field of Search ..................... 340/693.5, 691.1, 340/628, 692, 286.05, 506

(56) References Cited

U.S. PATENT DOCUMENTS

| 4,788,530 | A | | 11/1988 | Bernier | |
|---|---|---|---|---|---|
| 5,594,422 | A | * | 1/1997 | Huey et al. | 340/628 |
| 5,774,038 | A | * | 6/1998 | Welch et al. | 340/286.05 |
| 5,815,075 | A | * | 9/1998 | Lewiner et al. | 340/506 |
| 5,926,092 | A | * | 7/1999 | Kim | 340/571 |
| 6,144,310 | A | * | 11/2000 | Morris | 340/692 |
| 6,172,612 | B1 | * | 1/2001 | Odachowski | 340/628 |
| 6,353,395 | B1 | * | 3/2002 | Duran | 340/691.1 |
| 6,492,907 | B1 | * | 12/2002 | McCracken | 340/628 |

FOREIGN PATENT DOCUMENTS

| GB | 2376551 A | 12/2002 |
|---|---|---|
| JP | 61077754 A | 4/1986 |
| WO | WO 86/05908 A1 | 10/1986 |

OTHER PUBLICATIONS

Search Report dated Apr. 29, 2003 for British Application No. GB 0228532.8, a counterpart application of the above-identified application.

* cited by examiner

Primary Examiner—John Tweel
(74) Attorney, Agent, or Firm—Welsh & Katz, Ltd.

(57) ABSTRACT

A stand alone detector has two housings which are joined by a multi-conductor, aesthetically acceptable electrical cable. One housing can be plugged, via prongs into an available AC receptacle. The other housing can be located at an appropriate location for sensing the respective condition such as heat, gas, smoke, intrusion or position. The housings are releasably coupled to the cable.

64 Claims, 1 Drawing Sheet

APPARATUS AND METHOD FOR MOUNTING A DETECTOR

FIELD OF THE INVENTION

The invention pertains to ambient condition detectors. More particularly, the invention pertains to detectors which can be mounted in accordance with characteristics of the condition being sensed.

BACKGROUND OF THE INVENTION

A variety of consumer-type gas detectors are known. Some carbon monoxide detectors are battery powered. Others are intended to be plugged into an AC utility receptacle for power. Carbon monoxide tends to disburse relatively evenly in a region. As such, and unlike smoke detectors, monoxide detectors can be located in a variety of places and still effectively monitor a region.

Methane, which is lighter than air, tends to collect in upper regions, adjacent the ceiling. Hence, the preferred mounting location, for methane detectors, is above the normal installation location of AC-receptacles. Known detectors address this problem by providing a long AC power cord. While the detector can be mounted relatively high to shorten response time in the presence of methane, the AC line cord hanging from the detector to the closest available receptacle may be unsightly and unacceptable.

Thermal detectors are also known. These are mountable in a variety of locations where the ambient temperature is to be monitored. Attic installations can at times be inconvenient where batteries for primary power or for back-up of AC may need to be replaced from time-to-time. Additionally, attic temperatures are higher at times than the temperatures of lower, occupied floors. Such elevated temperatures can substantially shorten battery life.

Thus, there continues to be a need for more versatile, and aesthetically acceptable detectors. Preferably, such detectors will facilitate placement to minimize response time while at the same time minimize optical intrusiveness.

SUMMARY OF THE INVENTION

A self-contained, stand alone detector has first and second housings joined by a flexible conductor. One housing contains a power supply. A plug for coupling to utility power can also be provided.

A second, separate, housing carries at least one sensor. Sensor types can include carbon monoxide, carbon dioxide, methane, propane, smoke, thermal, intrusion and position.

The second housing can be mounted at a location consistent with the characteristics of the type of condition being sensed. The first housing can be plugged into a convenient utility receptacle. The two housings can be connected by a conductive cable. Detectors can be interconnected to a three wire (AC, neutral, alarm) cable.

In one embodiment, each housing can carry a connector. One usable type of connector is a standard telephone jack. In this embodiment, a standard multi-line, modular telephone-type cable of an appropriate length can be used to interconnect the housings. Other types of connectors or cables can also be used without departing from the spirit and scope of the invention. One advantage of this embodiment is that the interconnecting cable is low voltage, optically inconspicuous, are easily installable by the user.

A rotatably mounted display can be carried by the second housing. An audible alarm and/or display can be carried by the first housing. A source of illumination such as an LED or incandescent lamp could be incorporated into one or both housings.

The two housings can be provided, in a disclosed embodiment, mechanically connectable to one another. They can be slid, tipped, unlatched, or rotated apart from one another.

In one aspect, a wired or wireless link can be provided to a personal computer or personal digital assistant. Information concerning the sensed ambient condition can be transferred to and displayed thereat.

In another aspect, the audible alarm can be implemented as an electronic-type sounder. Such sounders can be used to emit alarm tones. Alternately, they can be driven to verbally output alarm type or alarm location statements.

Numerous other advantages and features of the present invention will become readily apparent from the following detailed description of the invention and the embodiments thereof, from the claims and from the accompanying drawings.

DETAILED DESCRIPTION OF THE PREFERRED EMBODIMENTS

Figure 1:
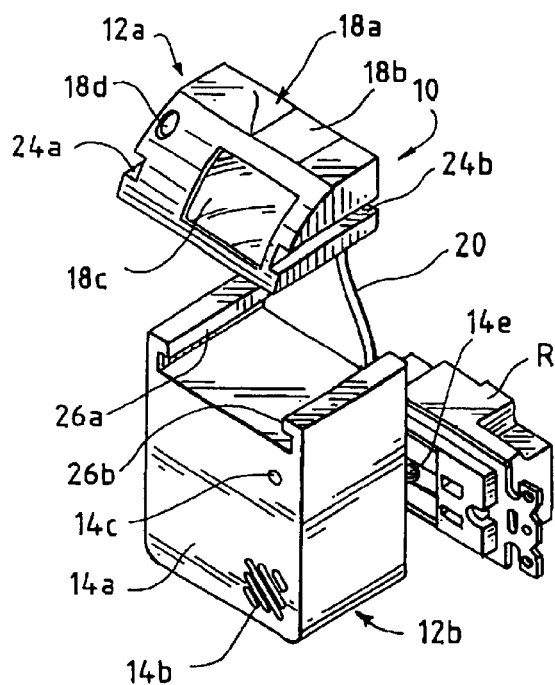
FIG. 1 is a perspective view, partly broken away, of a gas detector in accordance with the present invention.

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

FIG. 1 illustrates an ambient condition detector 10 in accordance with the present invention. Detector 10 can be a stand alone unit powered by AC-type utility power with battery back-up. Alternately, detector 10 can be part of an interconnected group of detectors, for example via a three conductor cable. The detector 10 includes first and second separate units 12a and 12b.

Figure 2:
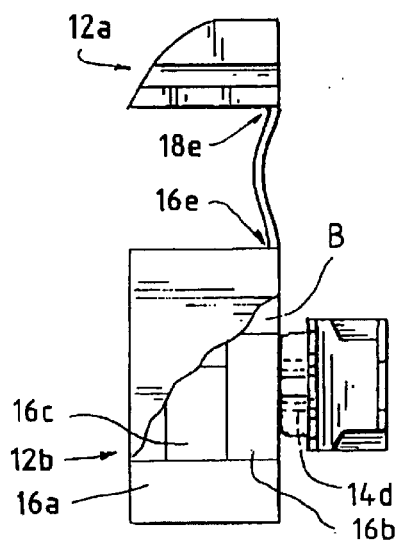
FIG. 2 is a side elevational view, partly broken away, of the detector of FIG. 1.

The unit 12b includes a housing 14a which is perforated, indicated generated at 14b to improve transmissivity of the output of an audible output device 16a, best seen in FIG. 2. If desired, a display 14a-1 can be provided on housing 14a, best seen in phantom in FIG. 3. Housing 14a also carries an on/off control switch 14c.

Figure 3:
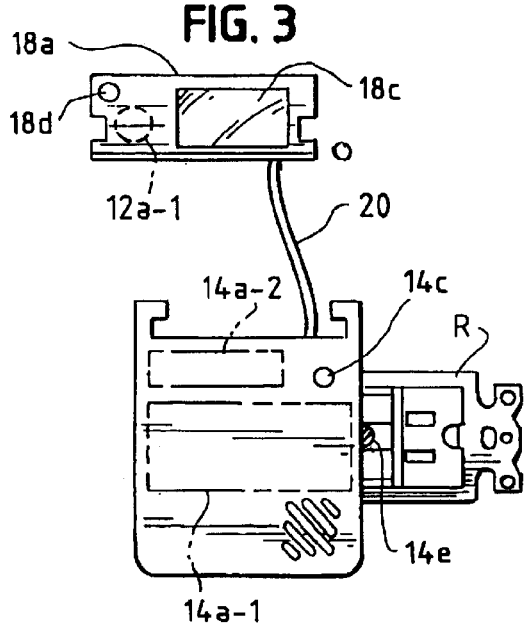
FIG. 3 is a front elevational view of the detector of FIG. 1.

Housing 14a can also carry a source of illumination 14a-2, illustrated in phantom in FIG. 3. Source 14a-2 could be an LED for signaling and/or a brighter light such as an incandescent or strobe light. Housing 12a can also carry a signaling and/or illumination source 12a-1.

The housing 12b carries a pair of AC prongs 14d, illustrated in phantom in FIG. 2. In use, the user who wishes to monitor a region for a selected condition such as temperature, smoke or gas, such as carbon monoxide, propane or methane, simply plugs the unit 12b into a convenient AC receptacle R to obtain electrical energy. The unit 12b also carries a back-up battery B in the event of a failure of utility supplied electrical energy.

The unit 12b, best seen in FIG. 2, carries an AC to DC power supply 16b and control circuitry 16c. The control circuitry 16c is coupled to the audible output device, which could be a piezo electric-type sounder, 16a, the power supply 16b, and the backup battery B. Audible output device 16a could also verbally output alarm type or alarm location.

Unit 12b also carries an electrical connector indicated generally at 16e which in turn is coupled to AC/DC supply 16b and control circuitry 16c. By way of example and not limitation, the connector 16e can be a standard, multi-conductor, modular telephone-type connector. Other types of connectors can be used without departing from the spirit and scope of the present invention.

Unit 12b also carries an attachment element 14e which can be used, in combination with a fastener such as a screw, to mechanically attach unit 12b to the receptacle R.

Unit 12a includes one or more sensors such as heat, smoke, gas, intrusion, position or the like, generally indicated at 18a which in turn are coupled to local control circuitry 18b. The control circuitry 18b is also coupled to a visual display 18c which could be implemented, for example as a liquid crystal display.

A manually operable switch 18d is provided on unit 12a for purposes of displaying, sequentially, a plurality of data on display 18c. For example, temperature, gas concentration values, or status can be displayed as well as alphanumeric status or alarm indicating messages. These messages in combination with the output from audible output device 16a can be used to provide both visible and audible alarm indications in the area of the detector 10, status information or the like.

Unit 12a also carries a connector generally indicated at 18e, which could be identical to the connector 16e and which is coupled to control circuitry 18b. It will be understood that the unit 12a in addition to carrying the display 18c can carry one or more light emitting diodes for indicating purposes.

The units 12a and 12b are coupled via multi-conductor cable 20, which could be implemented as multi-conductor telephone cable of a known type which is terminated in first and plugs which slideably engage the connectors 16e, 18e. The cable 20 can be any desired length and color that would be aesthetically desirable. The cable 20 communicates electrical energy from unit 12b to unit 12a. The cable 20 also provides bi-directional electrical communication between the units 12a, 12b and the control circuitry 16c and 18b.

In one embodiment, the control circuitry 18b can process outputs from one or more of the sensors 18a, which respond to one or more different types of conditions and make a determination as to the presence of one or more alarm conditions associated with one or more respective sensors. The circuitry 18b makes an alarm determination using any one of a plurality of processes as would be understood by those of skill in the art. Such processes and determinations are not limitations of the present invention.

The control circuitry 18b can in turn energize the display 18c presenting either a numeric or an alphanumeric alarm message. One or more light emitting diodes, carried on the unit 12a can be energized either to present a blinking pattern or a colored pattern to provide supplemental visual status information for the user. The circuitry 18b, via cable 20, can energize the audible output device 16a, which could be a sounder or a horn to provide an audible indication of the presence of temperature or the sensed type of alarm. The audible indication can include verbal outputs of temperature, type of sensed condition; or location. The audible indicator could alternately, or additionally be located in unit 12a.

The display 18c can be rotatably mounted relative to unit 12a. As a result, unit 12b can be plugged into a convenient receptacle R. Where smoke, temperature, methane, or, natural gas is being sensed, the unit 12a can be mounted above the receptacle R near the ceiling and coupled to housing 12b with an appropriate length of telephone cable 20. The display 18c can then be rotated appropriately for easy viewing depending on the height of the unit 12a from the floor.

If desired, the module 12a can be located in inconvenient or hard-to-reach areas. For example, where temperature is to be sensed in an attic, modular sensing unit 12a can be installed in the attic and coupled via cable 20 to base unit 12b. Unit 12b can be at any convenient receptacle R where it is user accessible. Alternately, module 12a could include a smoke and a gas sensor and be installed on a roof interior in an attic or similar location. Base unit 12b can be installed at any lower floor receptacle R.

Figure 4:
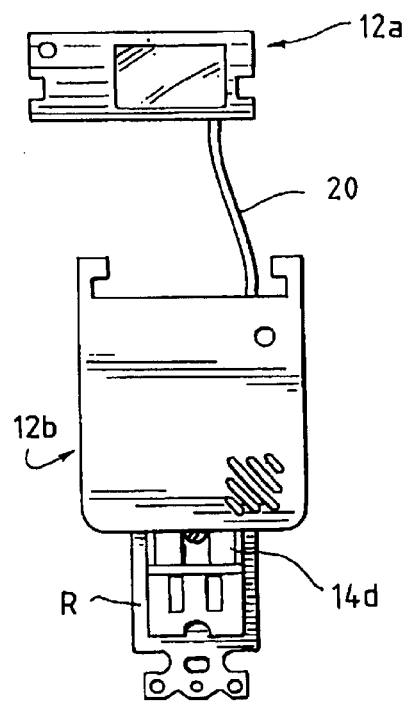
FIG. 4 is a front elevational view of the detector of FIG. 1 illustrating an alternate available configuration thereof.

FIG. 4 illustrates the advantage of rotatable prongs 14d in that the unit 12b can be mounted conveniently irrespective of the orientation of the receptacle R so as to not cover both of the available AC receptacles.

For pre-installation shipping and handling the unit 12a can be slideably coupled to the unit 12b, via slots 24a and b in unit 12a which slideably engage protrusions 26a and b in unit 12b. Alternately, unit 12a can be rotatably coupled to unit 12b or releasably latched to unit 12b. Other forms of releasable mechanical engagement of the housings come within the spirit and scope of the present invention.

While manually operable switches, such as 14c, 18d for example for test, silence, reset or other purposes have been illustrated, they need not be required for proper operation of the detector 10. However, a test or silence switch could be provided for user convenience.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed:

1. A two part, stand alone detector comprising:
   a first housing which carries a power supply and at least one of an alarm indicating audible and an alarm indicating visible output device;
   a second, separate housing which includes at least one ambient condition sensor wherein the housings are coupled by at least one conductor whereby the first housing can be mounted at a first location and the second housing can be mounted at a second, displaced location, and, wherein the two housings are mechanically couplable to one another.

2. A detector as in claim 1 wherein the housings each include a conductor connector and wherein the at least one conductor removably engages the connectors.

3. A detector as in claim 1 wherein the first housing carries a pair of rotatable AC prongs.

4. A detector as in claim 1 wherein the second housing includes a visual, ambient condition indicating display.

5. A detector as in claim 1 wherein one of the housings includes alarm determining circuitry.

6. A detector as in claim 1 wherein the first housing includes connections for receiving a replaceable back-up battery.

7. A detector as in claim 1 wherein the sensor is selected from a class which includes a temperature sensor, a smoke sensor, a gas sensor, an intrusion sensor and a position sensor.

8. A detector as in claim 7 wherein the gas sensor includes at least one of a methane sensor, a propane sensor, a carbon monoxide sensor and a carbon dioxide sensor.

9. A detector as in claim 7 wherein the power supply includes at least one of an AC/DC supply and a battery.

10. A detector as in claim 1 wherein the power supply includes an AC/DC power supply.

11. A detector as in claim 1 wherein the second housing comprises a rotatably mounted display.

12. A detector as in claim 1 which includes circuitry facilitating bi-directional communication between the housings.

13. A detector as in claim 10 wherein the first housing carries a member for attaching same to a power receptacle.

14. A detector as in claim 12 which includes an audible, alarm indicating output device carried by the first housing and a visible indicating device carried by the second housing.

15. A detector as in claim 14 wherein the visible indicating device is rotatably carried by the second housing and AC prongs are carried by the first housing.

16. A two part, stand alone detector comprising:
a hazardous condition sensor and circuitry for establishing an alarm condition carried by a mounting structure and a first electrical connector externally oriented relative to the mounting structure;
a housing having a supply circuit for providing electrical energy to the sensor with a second electrical connector;
a flexible conductor having one of, a selectable first and a second length, with third and fourth connectors terminating same whereby the third and fourth connectors releasably engage the first and second connectors thereby providing an electrical path therebetween of a user selectable length whereby the structure and the housing can be displaced from one another and the sensing process carried out displaced from the housing.

17. A detector as in claim 16 wherein the supply circuit comprises an AC/DC power supply carried in the housing.

18. A detector as in claim 17 wherein the housing carries a set of electrical prongs.

19. A detector as in claim 18 wherein the prongs are rotatable relative to the housing.

20. A detector as in claim 17 wherein the sensor comprises at least one of a gas sensor, a heat sensor and a smoke sensor.

21. A detector as in claim 20 wherein electrical energy is coupled to the sensor from the housing and an alarm indicator is coupled to the housing from the sensor.

22. A detector as in claim 21 which includes control circuitry, carried in the mounting structure, coupled to the sensor and the first electrical connector.

23. A detector as in claim 22 wherein the housing carries an audible output device.

24. A stand alone ambient condition detector comprising:
a first substantially closed housing; and
a second substantially closed housing wherein the housings releasably engage one another, with only a mechanical connection, with one housing carrying an ambient condition sensor and one housing carrying a power supply for the sensor where each housing is joinable to the other by a removably attachable, flexible electrical conductor.

25. A detector as in claim 24 wherein one housing includes a groove and the other includes a slot for slidably, mechanically engaging the two housings.

26. A stand alone ambient condition detector comprising:
a first substantially closed housing; and
a second substantially closed housing where the housings releasably engage one another, with only a mechanical connection, with one housing carrying an ambient condition sensor and one housing carrying a power supply for the sensor, the one housing has first and second spaced apart grooves and the other includes correspondingly spaced apart first and second slots for slidably receiving the grooves thereby mechanically engaging the two housings.

27. A stand alone ambient condition detector comprising:
a first substantially closed housing; and
a second substantially closed housing where the housings releasably engage one another, with only a mechanical connection, with one housing carrying an ambient condition sensor and one housing carrying a power supply for the sensor and where a rotatably mounted electrical utility prong extends from the one housing.

28. A detector as in claim 24 wherein the electrical conductor carries connectors to releasably connect to the housings.

29. A detector as in claim 24 wherein each housing carries an electrical receptacle.

30. A detector as in claim 29 where the conductor comprises a multiple conductor cable for releasably engaging the receptacles.

31. A detector as in claim 30 wherein some of the conductors supply electrical energy to one housing from the other.

32. A detector as in claim 30 wherein the cable carries first and second receptacle engaging terminations.

33. A detector as in claim 30 wherein the sensor comprises at least one of a heat sensor, a smoke sensor, a gas sensor, or intrusion sensor.

34. A detector as in claim 28 wherein the one housing which carries the sensor, carries control circuitry, coupled to the sensor for, at least in part, making an alarm determination.

35. A detector as in claim 34 which includes a visual display carried by one of the housings.

36. A detector as in claim 34 which contains at least one of an alarm indicating audible output device and an alarm indicating visual output device carried by one of the housings.

37. A detector as in claim 35 wherein the visual display is carried by the housing which carries the sensor and an alarm indicating audible output device is carried by the other housing.

38. A detector as in claim 37 wherein the other housing carries an AC-type power receiving prong.

39. A detector as in claim 38 wherein the other housing can be coupled to an AC-type receptacle and the housing which carries the display can be mounted at an appropriate sensing location and wherein the housings are electrically joined by the electrical conductor.

40. A detector as in claim 38 wherein the display is rotatably carried by the respective housing.

41. A method of detecting a condition comprising:
providing a stand alone, detector having a sensing unit and a separate alarm indicating unit which are mechanically couplable together;
separating the two units from one another;
coupling the units together with an elongated conductor;
positioning the units at separate locations;
energizing the sensing unit from the alarm unit; and activating the alarm unit in response to an alarm condition detected at the sensing unit thereby emitting at least one of an audible alarm and a visible alarm.

42. A method as in claim 41 wherein the coupling step includes releasably connecting a plurality of electrical paths between the units.

43. A method as in claim 42 which includes displaying a sensed condition parameter at the sensing unit.

44. A method as in claim 41 which includes, after the separating step, mechanically engaging the alarm indicating unit with an electrical receptacle.

45. A method as in claim 44 which includes one of, slidably disengaging, rotatably disengaging, or unlatching the units from one another.

46. A method as in claim 41 wherein the sensing unit is positioned at a location appropriate for the condition being sensed and the alarm unit is positioned adjacent to an electrical receptacle.

47. A method as in claim 46 which includes selecting an electrical conductor of a length which corresponds to the distance between the units and coupling the conductor thereto.

48. A method as in claim 47 which includes conducting an analysis of sensed gas and establishing the presence of at least one of a predetermined gas condition at the sensing unit and a predetermined fire condition at the sensing unit.

49. A method as in claim 48 which includes signaling via the electrical path the established presence of the at least one condition to the alarm unit.

50. A method as in claim 49 wherein in response to a received signal, emitting audible alarms from both the alarm unit and the sensing unit.

51. A method as in claim 50 includes coupling the alarm unit with a selected orientation to an exterior electrical receptacle.

52. A method as in claim 51 which includes choosing between at least two different orientations for the alarm units.

53. A method as in claim 41 wherein the activating step includes verbally identifying at least an alarm type.

54. A method as in claim 53 wherein the activating step includes verbally identifying an alarm location.

55. A stand alone, two part ambient condition detector comprising:

at least one sensor carried by a first housing;

an AC-type plug for engagement with an energy source and an audible output device carried by a second housing; and a flexible electrical cable coupling the housings together wherein the cable removably engages both housings.

56. A detector as in claim 55 wherein the sensor is selected from a class which includes a heat sensor, a smoke sensor, and a gas sensor.

57. A detector as in claim 55 which includes circuitry to drive the audible output device to output alarm related information selected from a class which includes an alarm indicating tonal output, an alarm indicating verbal output and a location indicating verbal output.

58. A detector as in claim 56 which includes a second, different sensor carried by one of the housings.

59. A detector as in claim 56 wherein the housings carry mechanical interhousing coupling elements whereby the housings are releasably couplable together.

60. A detector as in claim 56 wherein the electrical cable is selected from a class which includes a cable of a first length and a cable of a second, longer, length.

61. A detector as in claim 55 which includes a visual output device selected from a class which includes a light emitting diode, a strobe light, a florescent-type light and an incandescent-type light.

62. A detector as in claim 61 wherein the visual output device is located at one of the housings.

63. A detector as in claim 62 wherein the audible output device comprises at least one of alarm location verbalizing circuits and alarm type verbalizing circuits.

64. A detector as in claim 62 which includes at least one speech output circuit at one of the housings.

* * * * *